United States Patent

Saiki et al.

[11] Patent Number: 5,814,572
[45] Date of Patent: Sep. 29, 1998

[54] GLASSY SINTERED BODY

[75] Inventors: Kazuo Saiki, Toki; Masami Kato, Tajimi; Kokichi Hanaoka, Ueda, all of Japan

[73] Assignee: Crystal Clay Corporation, Tokyo, Japan

[21] Appl. No.: 948,590

[22] Filed: Oct. 10, 1997

Related U.S. Application Data

[63] Continuation of Ser. No. 699,194, Aug. 19, 1996, abandoned, which is a continuation of Ser. No. 433,429, filed as PCT/JP93/01285, Sep. 9, 1993, published as WO95/07246, Mar. 16, 1995, abandoned.

[30] Foreign Application Priority Data

Mar. 9, 1992 [JP] Japan ......................... 4-85917

[51] Int. Cl.⁶ .................. C03C 14/00; C04B 14/12
[52] U.S. Cl. .................. 501/32; 501/129; 501/131; 501/141; 501/155; 106/DIG. 4
[58] Field of Search .............. 501/32, 129, 130, 501/131, 143, 144, 141, 155; 106/DIG. 4

[56] References Cited

U.S. PATENT DOCUMENTS

| | | | |
|---|---|---|---|
| 3,900,303 | 8/1975 | Mackenzie | 501/32 |
| 4,533,644 | 8/1985 | Jones | 501/32 |
| 5,028,569 | 7/1991 | Cihon | 501/32 |
| 5,389,583 | 2/1995 | Schulze | 501/32 |
| 5,538,526 | 7/1996 | Edwards | 65/262 |
| 5,583,079 | 12/1996 | Golitz et al. | 501/32 |
| 5,665,290 | 9/1997 | Koslowski et al. | 264/669 |

FOREIGN PATENT DOCUMENTS

| | | |
|---|---|---|
| 5477607 | 6/1979 | Japan . |
| 56-109869 | 8/1981 | Japan . |
| 57-67075 | 4/1982 | Japan . |
| 62-30653 | 2/1987 | Japan . |

*Primary Examiner*—Mark L. Bell
*Assistant Examiner*—Louis M. Troilo
*Attorney, Agent, or Firm*—Birch, Stewart, Kolasch & Birch, LLP

[57] ABSTRACT

An object of the present invention is to provide a glassy sintered body and to effectively reuse scrapped glass.

The glassy sintered body of the present invention is made by preparing a raw material of the body by adding ceramic clay to glass as a main element so as to adjust the amount of water and kneading the glass and the clay, forming the raw material into a prescribed form, and sintering the formed material.

3 Claims, No Drawings

GLASSY SINTERED BODY

This application is a continuation of application Ser. No. 08/699,194, filed on Aug. 19, 1996, which is a continuation of application Ser. No. 08/433,429, filed as PCT/JP93/01285 Sep. 9, 1993 published as WO95/07246 Mar. 16, 1995, both now abandoned.

BACKGROUND OF THE INVENTION

1. Field of Invention

The present invention relates to a glassy sintered body.

2. Description of the Related Art

Conventionally, glass products, e.g., bottles, which are once used are usually scrapped, but recently the collection of waste materials has been required for the protection of the environment and the conservation of resources, so the reuse of the scrapped glass has been positively pushed forward. Since the glass products, e.g., glass bottles, are produced in bulk, an effective system of collecting and reusing the scrapped glass is being required.

Various types of glass, e.g., soda-lime glass, lead glass, and borosilicate glass, are used for producing glass products. The main component of said glass is silica, and it occupies about 70% of the soda-lime glass; about 70–80% of the borosilicate glass; and about 60% of the lead glass.

In the earthenware industry field, glass is used as a glaze. For example, frit glaze for ornamentation of surfaces of earthenware, e.g., tiles, is made from the glass. However, this is not an effective system for the reusing of the scrapped glass because the amount of scrapped glass reused is not so large.

The present invention has been invented to effectively reuse the scrapped glass, more precisely reuse the scrapped glass for manufacturing good earthenware, such as tiles.

A raw material of earthenware such as tiles is usually made by adding pottery clay and aggregates to clay soil, which is a main element thereof. The composition of the clay soil is as follows:

ferric oxide ($Fe_2O_3$) 1.0% or less;

alumina ($Al_2O_3$) 15% or more;

silica ($SiO_2$) 70% or more;

sodium oxide ($Na_2O$) 0.5% or less;

calcium oxide (CaO) 0.5% or less; and balance.

As shown above, the silica is the main element of the clay soil, so using the scrapped glass for the raw material of the earthenware can be estimated.

However, with respect to the earthenware, the glass has not only a much lower melting point, but also a quite lower stiffness. Thus, the glass has not been employed to manufacture construction materials such as tiles, so no glassy construction materials have been used before.

SUMMARY OF THE INVENTION

An object of the present invention is to effectively reuse a large amount of the scrapped glass, which has not been reused before, for conservation of resources, and another object is to provide a new and good glassy sintered body, which can be used as the construction materials.

To achieve the objects, the glassy sintered body of the present invention has following characteristics.

Namely, the glassy sintered body is prepared by a process wherein a raw material of the body is made by adding ceramic clay to glass as a main element so as to adjust amount of water, kneading the glass and the clay, forming the raw material into a prescribed form, and sintered the formed material is sintered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In the present invention, scrapped glass, e.g., glass bottles, can be effectively employed as the glass, and the sintered body can be manufactured by adding the ceramic clay to the scrapped glass to make the raw material and sintering the raw material formed into the prescribed form. Note that, it is proper to knead powdery glass and the ceramic clay.

When the mixture rate of the glass with respect to the ceramic clay is greater, a large amount of glass can be effectively used, but the upper limit of said rate of the glass is preferably about 70–75 WT % in order to manufacture the sintered bodies with fixed quality.

By employing the ceramic clay with the glass, the sintered bodies prepared have a fine composition. The sintering temperature of the raw material, which is made by kneading the glass and the ceramic clay, is higher than that of the case of glass only. Because higher sintering temperature, the fine sintered bodies can be provided. Ordinary clay, e.g., bentonite, kaolinite, can be used as the ceramic clay.

The sintered bodies of the present invention have greater stiffness, durability, etc., so they can be properly employed as construction materials, e.g., tiles for interior or exterior wall or flooring. If scrapped glass is employed as the glass, the cost of the raw material can be reduced, and the protection of environment and the conservation of resources can be positively pushed forward since the scrapped glass, which was scrapped before, is reused as the main element of the raw material.

EMBODIMENTS

Embodiments of the glassy sintered body of the present invention will now be described.

Embodiment 1

A raw material includes scrapped glass, bentonite as the ceramic clay, etc. with the following mixture rate:

scrapped glass 75 WT %;

bentonite 22 WT %; and water 3 WT %.

The scrapped glass is formed into a powder form and kneaded with the bentonite so as to adjust water rate in the raw material; the kneaded raw material is formed into a tile form; then the formed material is sintered for 30 minutes at a temperature of 1000° C. By the above steps, a fine sintered body can be manufactured.

Embodiment 2

Scrapped glass, bentonite, etc. with the following mixture rate are kneaded to make a raw material; then the formed raw material is sintered for 30 minutes at a temperature of 1000° C. The scrapped glass is formed into a powder. By the above steps, a fine sintered body can be manufactured.

Scrapped glass 70 WT %;
bentonite 27 WT %; and
water 3 WT %.

Embodiment 3

Scrapped glass, kaolinite, etc. with the following mixture rate are kneaded to make a raw material; then the formed raw material is sintered for 30 minutes at a temperature of 1050° C. The scrapped glass is formed into powdery form. By the above steps, a fine sintered body can be manufactured.

Scrapped glass 75 WT %;
kaolinite 22 WT %; and
water 3 WT %.

In the above described Embodiments, the bentonite and the kaolinite are employed as the ceramic clay, but preferable sintered bodies can be gained by employing other kinds of ceramic clay, which are usually used for ceramic production.

The quality of the scrapped glass is not limited, and glass powders, which are secondarily produced in another machining step, etc. can be, of course, employed as the glass element.

In case that the glass is included quite a little as described in the Embodiments and especially in the case of deoxidative sintering, surfaces of the sintered bodies are sometimes colored; this phenomenon does not occur when only one ceramic clay is sintered, so that the glassy sintered bodies, which are uniquely colored, can be manufactured.

Successively, the quality examination of samples of the Embodiment 1 will be explained. Each sample of the glassy sintered bodies are formed into rectangular parallelepiped shapes with the size 200×250×20 mm.

① The water absorption rate is indicated by the following formula:

{(mass when water is fully sucked)−(mass when no water is absorbed)}÷(mass when no water is sucked).

The mass when no water is absorbed is 176.72 g; and the mass when water is fully absorbed is 176.79 g, so the water absorbed rate is 0.039%. This water absorbed rate is an average value, and each water absorbed rate is scattered within 0.012%.

In case that the water absorbed rate is 5.0% or less, the sintered body is called "stoneware type"; in case that the water absorbed rate is 1.0% or less, the sintered body is called "chinaware type". The samples have very low water absorbed rate, so that they are perfect chinaware type glassy sintered bodies.

② The abrasion-resistance ability

The mass before abrasion is 98.6321 g; and the mass after abrasion is 98.6203 g, so the abraded mass is 0.0118 g. Each abraded mass is scattered within 0.0008 g. Note that, JIS or Japanese Industrial Standard requires the abraded mass of materials for flooring and mosaic tiles 0.1 g or less. Therefore, the samples of the embodiment satisfy the standard.

③ The flexural rigidity

Bending force was applied to the samples; an average breaking load was 408 Kgf. Namely, it is 159.4N/cm. Each breaking load is scattered within 1.2.

JIS requires the flexural rigidity as follows:
materials for interior walls—12N/cm or more;
interior flooring—60N/cm or more;
exterior walls with thickness 160 mm or less—80N/cm or more;
exterior walls with thickness more than 160 mm—100N/cm or more; and
exterior flooring—120N/cm or more.

Therefore, the samples of the embodiment satisfy the standard.

④ The cold- and chemical-resistance ability

In spite of 10-cycle cold-resistance test, there is nothing abnormal about the samples. And in the chemical-resistance tests in 3% hydrochloric acid solution and 3% sodium hydroxide solution, there is also nothing abnormal about them.

As described in the above Embodiments, the glassy sintered bodies employing the scrapped glass as the glass element have superior features, such as stiffness, so that they can be used in a number of fields, e.g., interior and exterior construction materials. Said samples are formed into rectangular parallelepiped shapes or block shapes, but the sintered bodies, of course, can be formed into many shapes according to various methods of forming. The forming of the raw material can be executed by a conventional wet-type extrusion molding method or a dry-type press molding method; and the sintering can be executed by an oxidative sintering method or a deoxidative sintering method. So the glassy sintered bodies of the present invention have a further advantage: they can be manufactured through a conventional method and by a conventional manufacturing machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A glassy sintered body consisting essentially of a sintered raw material,
   wherein said raw material is a mixture made by adding 25–30 wt. % of bentonite, which includes 3 wt. % of water, to 70–75 wt. % of a powdery glass crushed into a powder form, kneading said mixture of said powdery glass and said bentonite, and forming said kneaded raw material,
   wherein said raw material is sintered at a temperature between 950° and 1000° C.

2. A method of manufacturing a glassy sintered body, consisting essentially of the steps of:
   adding 25–30 wt. % of bentonite, which includes 3 wt. % water, to 70–75 wt. % of a powdery glass crushed into a powder form, which is a main element;
   kneading said powdery glass and said bentonite to make a raw material;
   forming said raw material; and
   sintering said formed material at a temperature between 950° and 1000° C.

3. A method of manufacturing a glassy sintered body, comprising the steps of:
   adding bentonite to scrapped glass;
   kneading said scrapped glass, and said bentonite to make a raw material of 22–25 wt % bentonite and 70–75 wt % of scrapped glass, having 3 wt % of water;
   forming said raw material with a press machine; and
   sintering said formed material at a temperature between 950°–1000° C.

* * * * *